United States Patent [19]

Iwanciow et al.

[11] 3,709,652

[45] Jan. 9, 1973

[54] VERY LONG BURN DURATION HYBRID COMBUSTOR

[75] Inventors: Bernard L. Iwanciow, Sunnyvale; Allen L. Holzman, Palo Alto, both of Calif.

[73] Assignee: United Aircraft Corporation, East Hartford, Conn.

[22] Filed: May 19, 1969

[21] Appl. No.: 825,886

[52] U.S. Cl. ................................. 431/96, 60/251
[51] Int. Cl. ............................................. F21k 5/00
[58] Field of Search ............. 431/96; 102/39; 60/251

[56] References Cited

UNITED STATES PATENTS

| 2,921,521 | 1/1960 | La Haye et al. | 102/39 |
|---|---|---|---|
| 2,945,343 | 7/1960 | Gongwer | 60/227 |
| 2,987,881 | 6/1961 | Mullane | 60/254 |
| 3,128,599 | 4/1964 | Carr | 60/235 |
| 3,156,092 | 11/1964 | Holzman | 60/251 |
| 3,325,998 | 6/1967 | Novotny | 60/251 |
| 3,358,452 | 12/1967 | Ehrenfeld et al. | 60/229 |
| 3,456,440 | 6/1969 | Keller | 60/251 |

*Primary Examiner*—Samuel Feinberg
*Attorney*—Steven F. Stone

[57] ABSTRACT

A long burning hybrid combustor is described wherein an oxidizer injector is mounted within a centrally extending port in a fuel grain, the injector outlet being in proximity to the truncated end of a concave conical surface formed by a cavity in the downstream end of the fuel grain. The downstream end of the fuel grain is restrained and constant force means are employed to drive the grain in a downstream direction as the grain is burned. Ignition means comprising a coaxially extending tube, mounted within the oxidizer injector, supplying a gaseous fuel to form a combustible mixture at the outlet of the injector and means for forming a spark at the outlet are also described.

8 Claims, 2 Drawing Figures

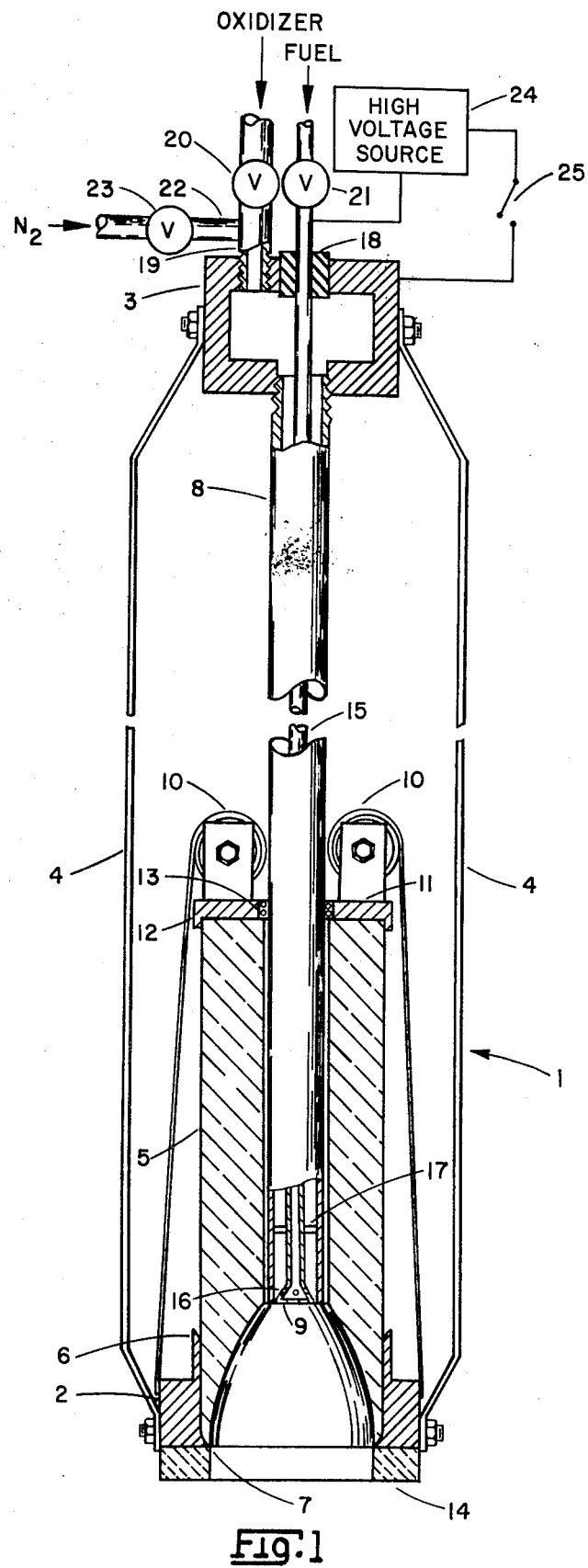

3,709,652

VERY LONG BURN DURATION HYBRID COMBUSTOR

BACKGROUND OF THE INVENTION

It has long been known that the rocket motors are relatively compact combustors suitable for the generation of a gaseous working fluid usable in various non-propulsion applications such as the generation of a pressurizing medium, the generation of an intense source of radiant energy usable for illumination or as targets for homing missiles, for example. Various attempts have been made to utilize rocket motors for such non-propulsion functions. Hybrid combustors employing a solid fuel and a fluid oxidizer or vice versa would appear particularly suited for such use since they are relatively simple in construction and control, can employ components of relatively long shelf life and can be started and stopped repeatedly.

Unfortunately, the requirements for an effective rocket motor are antithetical to those of an efficient combustor designed for purposes other than producing reaction thrust. For example, rocket motors burn the fuel and oxidizer at relatively high consumption rates within a combustion chamber and exhaust the products through a sonic (choked) orifice or nozzle to produce thrust. Thus, the reacting materials are consumed at a far greater rate than is necessary for a non-propulsion device; and if radiant energy is a desired output, a large portion of the radiant energy generated is unavailable since it is not transmitted through the combustion chamber.

For example, a combustor for non-propulsion use could be required to burn for 30 minutes or longer and such durations are not normally obtained in a conventional rocket motor. Further, for many non-propulsion uses it is neither necessary nor desirable to operate at the high combustion chamber pressures required when thrust is needed.

A typical hybrid rocket motor employs a hollow cylindrical fuel grain which burns at the surface of the central port. Thus, the burn time is a function of the wall or web thickness of fuel grain rather than the length and the O/F ratio may vary as the web is consumed. Attempts to produce an end-burning hybrid in which the burn time would be proportional to length have not proved satisfactory since the location of the burning surface with respect to the fluid injector or the outlet of the device or both will vary as the solid grain is consumed, thereby changing the operating characteristics of the device in a complicated manner. According to this invention, however, a long burn duration hybrid combustor is provided which operates at substantially ambient conditions while automatically maintaining the location of the burning surface with respect to the injector and the outlet throughout the burn period.

It is, accordingly, an object of this invention to provide a long burning hybrid combustor.

It is another object of this invention to provide a long burning hybrid combustor which automatically maintains the location of the burning surface of the solid component with respect to the fluid injector and the outlet of the combustor.

It is another object of this invention to provide a nozzleless hybrid combustor.

It is another object of this invention to provide a hybrid combustor wherein the O/F may be maintained constant.

These and other objects of this invention will be readily apparent by reference to the accompanying drawing wherein:

FIG. 1 is a schematic representation of a foreshortened side view, partly in section, of combustor according to this invention; and FIG. 2 is a foreshortened perspective view of another embodiment of the solid grain of FIG. 1 showing its initial configuration.

DESCRIPTION OF THE INVENTION

Referring now to FIG. 1, a nozzleless long duration hybrid combustor is shown generally as 1. As used herein, a combustor is considered to be "nozzleless" if there is no choked or sonic orifice located between the situs of combustion and the environment. The combustor 1 comprises a fixed grain support 2 and a fluid manifold 3 maintained in fixed spatial relationship by support means 4 or other suitable support means. The fixed grain support 2 is provided with a central cylindrical passage adapted to slidably receive the fuel grain 5. The upstream portion of this passage may be provided with a slight outward taper shown at 6 to facilitate insertion of grain 5 and the outlet or downstream portion of member 2 is provided with an inward taper to form lip 7 which restrain the motion of grain 5 as will be more fully described below.

Grain 5 is in the form of a hollow cylinder, the downstream portion of which is initially configured with a cavity to provide a concave truncated conical surface on the downstream end. The upstream end may terminate as shown in FIG. 1 or optionally, to provide for total consumption of grain 5 in the operation, the exterior surface of the upstream portion of grain 5 may have a conical configuration similar to that at the downstream end shown in FIG. 2. Such a configuration will permit total consumption of the fuel grain. As used herein, the term "conical" is not used in its strict geometric sense and does not require that the line generating the surface of revolution be a straight line. The line can be curved as shown to produce the configurations as shown in FIGS. 1 and 2.

Grain 5 is mounted within the member 2 with the injector tube 8 positioned within the port of grain 5. The upstream end of injector tube 8 is in communication with the interior of manifold 3 and the downstream end of tube 8 is positioned in proximity to the point of intersection of the port of grain 5 and the conical surface and is supplied with spray means 9 to produce a spray pattern of fluid that will flow over the conical surface of grain 5. Means are provided for applying a constant force, acting in a downstream direction, to grain 5. Any electrical, mechanical, hydraulic or pneumatic device may be used to accomplish this result. A simple lightweight mechanism, utilizing constant force springs such as those sold under the trade name of Neg-ator by the Hunter Spring Division of Ametek Inc. is particularly useful. As shown, a plurality of constant force springs 10 are uniformly distributed about a support plate 11, provided with a grain-receiving lip 12 and slidably mounted around injector tube 8 by bearing 13. The ends of springs 10 are fixed to support member 2, thereby maintaining a constant bias in the rearward direction on grain 5.

A layer of thermal insulation 14 made from a refractory material such as firebrick, for example, may be mounted on member 2 to protect the member and the grain from the heat generated by the exhaust gases.

If grain 5 and the oxidizer employed are hypergolic, no ignition means are required. However, if the materials are not hypergolic, some ignition means must be employed to heat the surface of grain 5 to a temperature sufficient to permit continued combustion. The conventional means for accomplishing this is to supply a hot gas stream to the surface just prior to the introduction of the fluid from injector 8. Normally the hot gas would be generated by burning a small portion of a fuel and the oxidizer at the upstream end of the device. However, due to the length of the injector tube 8, undesirable cooling of the gases and heat transfer to the grain 5 occur. Accordingly, a preferred ignition system is illustrated wherein the hot gas stream is generated at the downstream end of the injector. According to this system, the injector tube 8 is provided with a coaxial tube 15 which terminates at its downstream end in plug member 9 provided with ports 16. Tube 15 is separated from tube 8 by spider 17 formed from an electrical insulator. Similarly tube 8 is electrically insulated from manifold 3 by insulating plug 18. The oxidizer is supplied to manifold 3 from a suitable source, not shown, through line 19 and variable flow valve 20, and fuel is supplied to tube 15 from a suitable source, not shown, through valve 21. Suitable fuels would include hydrogen and low molecular weight hydrocarbons such as methane, butane, or ethane, for example. Optionally a source of nitrogen or other purging or combustion extinguishing agent may be connected to the manifold through line 22 and valve 23. A source of high voltage current 24 is connected to tube 15 and to manifold 3 which is in electrically conducting relationship with injector tube 8. A switch 25 is inserted in the circuit so that a spark across the end of plug 9 and tube 8 can be formed when desired. In operation the fuel grain 5 would be mounted in the member 2 with the lip 7 restraining the downstream motion of the grain 5. When operation is desired, valve 21 and valve 20 would be opened to permit the fuel and oxidizer to flow through the system. Switch 25 would then be closed to produce a spark between member 9 and tube 8 which would ignite the initial mixture and establish combustion on the inner conical surface of grain 5. Switch 25 would then be opened and valve 21 would be closed. While this may be accomplished mechanically suitable electrical sequencers would normally be employed. As the combustion process occurs at the conical surface portion, the grain 5 will soften slightly and tend to assume the configuration shown in FIG. 1. The constant force springs continually urge the grain downstream, and if the oxidizer flow rate is varied, the rate at which the grain moves downstream would automatically adjust to the variation in the rate at which the grain is consumed. If intermittent operation is required, valve 20 would be closed and to assure complete extinguishment, valve 23 would be opened to permit nitrogen to flow across the burning surface and extinguish any residual combustion. Re-ignition could be accomplished in the manner previously described.

The fuel grain is preferably made from a material which does not char and which softens rather than melts on exposure to high heat fluxes. Suitable materials include carboxy-terminated polybutadiene polymers, polymethylmethacrylate, and cross-linked polystryene polymers. Additives such as carbon black or ionizable materials which can produce radiation at predetermined frequencies can be dispersed in the grain if desired. These polymers are particularly suitable for use with an oxygen oxidizer. Other oxidizers usable with various fuel components are known to the art and would include $N_2O_4$, $F_2$, $Cl_2$, fuming nitric acid and interhalogen compounds, for example.

In operation a grain of polymethylmethacrylate 19 inches long having internal diameter of 1.0 inches and an external diameter of 2.5 inches and an internal conical surface 4 inches long was burned for approximately 20 minutes using a flow rate of 0.0024 pounds per second of oxygen at an O/F of approximately 1.2. A constant force of about 5 pounds urged the grain against a restriction of 2.15 inches, I.D.

Throughout this disclosure the grain 5 has been considered to be formed of fuel material with the fluid being the oxidizer. This was done since the conventional hybrid rocket motor employs solid fuels and fluid oxidizers, however, it is readily apparent that the grain 5 could be made of an oxidizer material and the fluid component could be the fuel. In such a system, the material injected through line 15 would necessarily have to be an oxidizer material.

While this invention has been described with respect to a specific embodiment thereof, it should not be construed as limited thereto. Various modifications may be made without departing from the scope of this invention which is limited only the following claims wherein:

We claim:

1. A long burning hybrid combustor for combusting a solid component and a fluid component comprising in combination:

a. a grain support member comprising a body provided with a hollow cylindrical port, the downstream portion of which is provided with means restricting the internal diameter of said port, b. a hollow cylindrical grain formed from a said solid component, the inner surface of said grain being provided at the downstream end with a conical surface, said end being received in sliding relationship to said cylindrical port and abutting said means restricting the internal diameter of said port, c. fluid supply means for supplying said fluid component to the conical surface of said grain, d. means for maintaining said fluid supply means and said grain support member in fixed spacial relationship, e. means for applying a force to said grain, said force acting to urge said grain against said means for restricting the internal diameter of said port whereby said grain will move in the downstream direction as the grain is consumed by combustion, and means for supplying a combustion extinguishing agent to said conical surface.

2. The apparatus of claim 1 wherein said means restricting the internal diameter of said port comprises an inwardly extending annular lip on said grain support member.

3. The apparatus of claim 1 wherein said fluid supply means comprises an injector tube coaxially mounted within said hollow cylindrical grain, said tube terminating at its downstream end in proximity to the concave conical portion of said grain and being provided at said end with means for directing said fluid component at said conical surface.

4. The apparatus of claim 1 wherein said means for applying a force to said grain comprises means for applying a constant force to said grain.

5. The apparatus of claim 4 wherein said constant force means comprise constant force spring means acting upon and uniformly disposed about said grain.

6. The apparatus of claim 1 wherein said hybrid combustor is nozzleless.

7. The apparatus of claim 1 further comprising means for varying the flow rate of said fluid component.

8. A long burning hybrid combustor for combusting a solid component and a fluid component comprising in combination:

a. a grain support member comprising a body provided with a hollow cylindrical port, the downstream portion of which is provided with means restricting the internal diameter of said port, b. a hollow cylindrical grain formed from said solid component, the inner surface of said grain being provided at the downstream end with a conical internal surface and at the upstream end with a substantially similar conical external surface, said downstream end being received in a sliding relationship to said cylindrical port and abutting said means restricting the internal diameter of said port, c. fluid supply means for supplying said fluid component to the conical surface of said grain, d. means for maintaining said fluid supply means and said grain support member in fixed spacial relationship, and e. means for applying a force to said grain, said force acting to urge said grain against said means for restricting the internal diameter of said port whereby said grain will move in the downstream direction as the grain is consumed by combustion.

* * * * *